(12) United States Patent
Bessant

(10) Patent No.: US 11,317,655 B2
(45) Date of Patent: May 3, 2022

(54) VISUAL USER INTERFACE FOR AEROSOL-GENERATING DEVICES

(71) Applicant: PHILIP MORRIS PRODUCTS S.A., Neuchâtel (CH)

(72) Inventor: Michel Bessant, Neuchâtel (CH)

(73) Assignee: Philip Morris Products S.A., Neuchâtel (CH)

( * ) Notice: Subject to any disclaimer, the term of this patent is extended or adjusted under 35 U.S.C. 154(b) by 0 days.

(21) Appl. No.: 16/753,905

(22) PCT Filed: Sep. 25, 2018

(86) PCT No.: PCT/IB2018/057419
§ 371 (c)(1),
(2) Date: Apr. 6, 2020

(87) PCT Pub. No.: WO2019/069176
PCT Pub. Date: Apr. 11, 2019

(65) Prior Publication Data
US 2020/0260780 A1 Aug. 20, 2020

(30) Foreign Application Priority Data
Oct. 6, 2017 (EP) ..................................... 17195209

(51) Int. Cl.
*A24F 40/65* (2020.01)
*A24F 15/01* (2020.01)
(Continued)

(52) U.S. Cl.
CPC .............. *A24F 40/65* (2020.01); *A24F 15/01* (2020.01); *A24F 40/50* (2020.01); *A24F 40/60* (2020.01);
(Continued)

(58) Field of Classification Search
CPC .......... A24F 15/01; A24F 40/50; A24F 40/60; A24F 40/65; G06F 1/1652; G06F 3/0488
See application file for complete search history.

(56) References Cited

U.S. PATENT DOCUMENTS

| 2004/0065321 A1* | 4/2004 | Stenzler | ............ A61M 15/0065 |
| | | | 128/200.14 |
| 2015/0196057 A1* | 7/2015 | Wu | .......................... A24F 40/53 |
| | | | 131/329 |

(Continued)

FOREIGN PATENT DOCUMENTS

| RU | 2517125 | 5/2014 |
| RU | 2015144189 | 4/2017 |

(Continued)

OTHER PUBLICATIONS

International Search Report and Written Opinion, issued by the European Patent Office, for PCT/IB2018/057419; 14 pgs.
(Continued)

*Primary Examiner* — Seth A Silverman
(74) *Attorney, Agent, or Firm* — Mueting Raasch Group

(57) ABSTRACT

A user interface, such as a visual user interface, is configured to display a static or motion image around an aerosol-generating device (10). The aerosol-generating device includes a housing having a curved outer surface surrounding a longitudinal axis and a flexible display (20) having a curved viewing surface at least partially surrounding the longitudinal axis disposed adjacent to the curved outer surface. A control circuit (54) is operatively coupled to the flexible display and includes a memory to store a motion image (30). The control circuit is configured to display the motion image on the curved viewing surface in response to activation of the aerosolizer, which may be executed according to a method, which may be stored on a non-transitory
(Continued)

Figure 1:
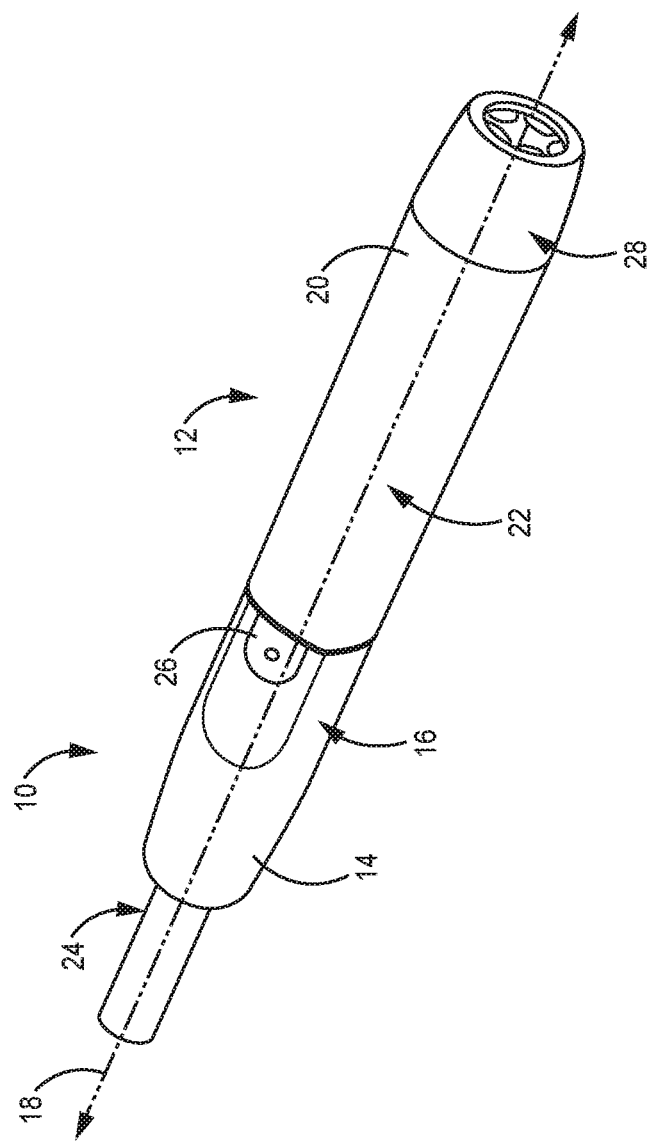

computer readable storage medium. A remote user device may be used with the aerosol-generating device.

13 Claims, 5 Drawing Sheets

(51) Int. Cl.
*G06F 1/16* (2006.01)
*G06F 3/0488* (2022.01)
*A24F 40/50* (2020.01)
*A24F 40/60* (2020.01)
*A24F 40/10* (2020.01)
*A24F 40/20* (2020.01)

(52) U.S. Cl.
CPC .......... *G06F 1/1652* (2013.01); *G06F 3/0488* (2013.01); *A24F 40/10* (2020.01); *A24F 40/20* (2020.01)

(56) References Cited

U.S. PATENT DOCUMENTS

| | | | |
|---|---|---|---|
| 2016/0227842 A1* | 8/2016 | Xiang | G05B 15/02 |
| 2016/0363917 A1* | 12/2016 | Blackley | G06Q 30/0601 |
| 2017/0014582 A1 | 1/2017 | Skoda | |
| 2017/0020188 A1* | 1/2017 | Cameron | A24F 40/60 |
| 2017/0251724 A1* | 9/2017 | Lamb | H05B 3/0014 |
| 2017/0360103 A1* | 12/2017 | Li | A24F 40/50 |

FOREIGN PATENT DOCUMENTS

| | | |
|---|---|---|
| WO | 20100073122 | 7/2010 |
| WO | 20140150898 | 9/2014 |
| WO | 20150106178 | 7/2015 |
| WO | WO 2016/123307 A1 | 8/2016 |

OTHER PUBLICATIONS

Extended European Search Report, issued by the European Patent Office for EP 17195209.6; 8 pgs.

Russian Office Action for RU Application No. 2020111558 issued by the Patent Office of the Russian Federation dated Jan. 18, 2022; 14 pgs. including English translation.

* cited by examiner

VISUAL USER INTERFACE FOR AEROSOL-GENERATING DEVICES

This application is the § 371 U.S. National Stage of International Application No. PCT/IB2018/057419, filed 25 Sep. 2018, which claims the benefit of European Application No. 17195209.6, filed 6 Oct. 2017, the disclosures of which are incorporated by reference herein in their entireties.

This disclosure relates to user interfaces, such as a visual user interface configured to display a static or motion image around an aerosol-generating device.

Handheld aerosol-generating devices, such as cartomizer electronic cigarettes, are known, which utilize liquid to be evaporated or solid material (which may contain tobacco) to be heated to generate an inhalable aerosol. These devices may provide an alternative experience to conventional combustion cigarettes. Some devices may adopt a similar look and feel to conventional cigarettes, which may be familiar, easy to handle, portable, and easy to manufacture. In particular, some devices are shaped with a rotationally symmetric cylindrical body and have an internal breath-activated switch to activate the generation, or release, of the inhalable aerosol.

Conventional cigarettes provide a palette of sensory experiences. These sensory experiences may include one or more senses, such as taste, smell, touch, hearing, and sight. Some examples of sight experiences of a conventional cigarette include seeing light when burning and reducing in length. On the other hand, alternative aerosol-generating devices often do not provide all the sensory experiences of a conventional cigarette. For example, the heater coil may be isolated from user interaction or may not give off light visible to the user, and consumption of the liquid store does not visibly reduce the overall length of the device.

It would be desirable to provide users of aerosol-generating devices with an improved experience with aerosol-generating devices that provides more sensory experiences to the user, particularly visual experiences, in response to user interaction while maintaining the familiar shape of a conventional cigarette. It would also be desirable to provide users with these visual experiences without complicating use of the device. It would further be desirable to provide users with the ability to customize the visual sensory experiences in a convenient manner.

Various aspects of the disclosure relate to an aerosol-generating device providing a visual user interface. The device includes a housing having a curved outer surface surrounding a longitudinal axis. The device also includes a flexible display having a curved viewing surface at least partially surrounding the longitudinal axis disposed adjacent to the curved outer surface. The device further includes an aerosolizer to generate aerosol from an aerosol-generating substrate. Still further, the device includes a control circuit operatively coupled to the flexible display and including a memory to store a motion image. The control circuit is configured to display the motion image on the curved viewing surface in response to activation of the aerosolizer.

In one or more aspects, the flexible display is an AMOLED display.

In one or more aspects, the flexible display is touch sensitive.

In one or more aspects, the flexible display is configured to display one or more selectable elements.

In one or more aspects, the flexible display extends around the longitudinal axis about 90 degrees or more.

In one or more aspects, the flexible display is in the shape of a partial cylinder.

In one or more aspects, the flexible display is disposed distal to a mouth portion, an actuator, or both, the actuator configured to activate the aerosolizer in response to being pressed by the user.

In one or more aspects, the control circuit is further configured to modulate the display of the motion image in response to a puff profile of a user puff used to activate the aerosolizer.

In one or more aspects, the motion image includes a colour change of at least one portion of the curved viewing surface.

In one or more aspects, the control circuit is further configured to display a static or motion image when a user is not puffing on the mouth portion of the device.

In one or more aspects, the memory is configured to store the motion image using at least about 500 kilobytes.

In one or more aspects, the memory is configured to store a plurality of images including the motion image.

In one or more aspects, the control circuit includes a communication interface configured to download one or more images from a remote user device.

Various aspects of the present disclosure relate to a remote user device for use with the aerosol-generating device. The remote user device is configured to provide the aerosol-generating device with one or more of an image, a user selection, and a configuration of the aerosol-generating device over a communication interface.

Various aspects of the present disclosure relate to a method for use with the aerosol-generating device. The method includes detecting activation of the aerosolizer the aerosol-generating device, and displaying the motion image on the curved viewing surface of the flexible display.

Various aspects of the present disclosure relate to a non-transitory computer readable storage medium including a stored computer program that, when run on programmable electric circuitry, causes the programmable electric circuitry to execute the method.

Advantageously, utilizing the aerosol-generating device with the visual user interface may provide a visual artistic effect that contributes to the palette of sensory experiences and interaction available to a user when puffing, not puffing, or both and that facilitate aesthetic interest in both solitary and social settings. At the same time, integration of the visual user interface around the device may allow the device to have shape similar to conventional cigarettes that is familiar. The aerosol-generating device may also provide a convenient manner of customizing the sensory experiences provided by the aerosol-generating device by allowing downloadable visual and artistic effects, selections, and configurations. Including a touch display on the aerosol-generating device may further increase interaction, reconfigurability, and customization of sensory experiences offered by the aerosol-generating device. Other benefits will become apparent to one skilled in the art having the benefit of this disclosure. The present disclosure describes herein the aerosol-generating device in more detail.

All scientific and technical terms used herein have meanings commonly used in the art unless otherwise specified. The definitions provided herein are to facilitate understanding of certain terms used frequently herein.

The term "aerosol-generating device" refers to a device including an aerosol-generating substrate. Preferably, the aerosol-generating device also includes an aerosolizer, such as an atomizer or heater.

The term "aerosol-generating substrate" refers to a device or substrate that releases, upon heating, volatile compounds that may form an aerosol to be inhaled by a user. Suitable aerosol-generating substrates may include plant-based material. For example, the aerosol-generating substrate may include tobacco or a tobacco-containing material containing volatile tobacco flavor compounds, which are released from the aerosol-generating substrate upon heating. In addition, or alternatively, an aerosol-generating substrate may include a non-tobacco containing material. The aerosol-generating substrate may include homogenized plant-based material. The aerosol-generating substrate may include at least one aerosol former. The aerosol-generating substrate may include other additives and ingredients such as flavorants. Preferably, the aerosol-generating substrate is a liquid at room temperature. For example, the aerosol forming substrate may be a liquid solution, suspension, dispersion or the like. Preferably, the aerosol-generating substrate may include glycerol, propylene glycol, water, nicotine and, optionally, one or more flavorants. Preferably, the aerosol-generating substrate includes nicotine.

The term "tobacco material" refers to a material or substance including tobacco, which includes tobacco blends or flavored tobacco, for example.

The present disclosure relates to visual user interfaces, such as a visual user interface for an aerosol-generating device. The term "cartomizer" refers to a combination of cartridge and atomizer that is part of an electronic cigarette.

The visual user interface may be at least partially provided by a display. The display may be disposed in any suitable location along the aerosol-generating device. The aerosol-generating device may include a mouth portion (which may include a mouth piece) and a controller portion (which may include a control circuit). A thermal brake may be disposed between the mouth portion and the controller portion. The display may be disposed distal to one or both of to the mouth portion and actuator. In particular, the display may be coupled to a housing of the aerosol-generating device.

The aerosol-generating device may include an aerosol-generating substrate. The aerosol-generating substrate may be formed of or be contained in a cartridge or heat stick, which may be coupled to the housing of the aerosol-generating device. The aerosol-generating substrate may be associated with an identifier of the substrate or of other parameters related to the substrate, such as an ideal heating temperature or capacity. The identifier may be disposed on a container of the substrate (for example, the cartridge or heat stick housing).

An aerosolizer may be operatively coupled to the aerosol-generating substrate to generate aerosol when activated. In particular, the aerosolizer may be thermally coupled to the aerosol-generating substrate. The aerosolizer may also be coupled to the housing of the aerosol-generating device. The aerosolizer may be at least partially or entirely disposed in the mouth portion of the aerosol-generating device. The aerosolizer may be at least partially disposed in the controller portion.

The aerosolizer may utilize any suitable technique for generating aerosol from the aerosol-generating substrate. The aerosolizer may use heat to generate aerosol and include a heating blade or a heater. Additionally, or alternatively, the aerosolizer may include a vibrating element, which may not need heat to generate aerosol. The heating blade may be useful for inserting into a solid substrate and being heated to produce aerosol. The heater may include a heating element disposed adjacent to a liquid substrate that is heated to produce aerosol. A heater may be a mesh heater. The mesh heater may allow liquid substrate stored in the storage compartment to pass through interstices in the mesh heater from one surface of the mesh to an opposite surface of the mesh.

The aerosolizer may be a heating blade that heats a smoking material substrate to generate aerosol from the smoking material. The aerosol-generating substrate may be contained in a substrate housing. The substrate may be described as, or as a content of, a heat stick. The aerosolizer may be coupled to the consumable device to aerosolize the heat stick or the heat stick contents. The heating blade may be inserted into the heat stick to heat the aerosol-generating substrate. The heat provided by the heating blade to the heat stick may not burn the smoking material. The smoking material may include tobacco.

The aerosolizer may include a heater, a heater coil, a chemical heat source such as a carbon heat source, or any suitable means that heats a liquid substrate to generate aerosol from a liquid substrate. The aerosolizer may receive electrical energy or power to release or generate aerosol from the liquid substrate. The aerosolizer may be a heater that varies in temperature depending on the electrical energy received. For example, the heater may rise in temperature in response to a higher voltage received. The aerosolizer may be disposed adjacent to the aerosol-generating substrate. For example, the aerosolizer may be coupled adjacent to the liquid substrate.

The aerosolizer may be compatible for use with an aerosol-generating substrate having a nicotine source and a lactic acid source. The nicotine source may include a sorption element, such as a PTFE wick with nicotine adsorbed thereon, which may be inserted into a chamber forming a first compartment. The lactic acid source may include a sorption element, such as a PTFE wick, with lactic acid adsorbed thereon, which may be inserted into a chamber forming a second compartment. The aerosolizer may include a heater to heat both the nicotine source and the lactic acid source. Then, the nicotine vapor may react with the lactic acid vapor in the gas phase to form an aerosol.

The aerosolizer may be compatible for use with an aerosol-generating substrate having a capsule that contains nicotine particles and disposed in a cavity. During a user's inhalation, the air flow may rotate the capsule. The rotation may suspend and aerosolize the nicotine particles.

The aerosol-generating device may include an actuator. The actuator may include a button or other type of switch. The actuator may be engaged in response to being pressed, toggled, or otherwise manipulated by the user. The engagement of the actuator may initiate various functionality of the aerosol-generating substrate. Visual user interface may be activated in response to engagement of the actuator. The aerosolizer may be activated in response to engagement of the actuator.

The actuator may be coupled to the housing of the aerosol-generating device. For example, the actuator may be disposed in or on the housing of the aerosol-generating device to be accessible by the user. In particular, the actuator may be disposed on the control portion of the aerosol-generating device. The actuator may be associated with one or more functions. The actuator may be used to power on (for example, activate) and power off (for example, deactivate) the aerosolizer or other components of the aerosol-generating device. The actuator may utilize any suitable mechanism to receive input from the user, such as a mechanical button that may be pressed by the user.

A power source may be used to provide power to the aerosolizer or other components of the aerosol-generating device. The power source may be operatively coupled to at least the aerosolizer. The power source may also be operatively coupled to the display or the control circuit. The power source may be disposed in the controller portion of the aerosol-generating device. The power source may be a battery. The battery may be disposable or rechargeable. The power source may include a charging interface configured to operatively couple to an external power source to charge the battery.

In addition, or as an alternative to the actuator, a puff sensor may be operatively coupled to the aerosolizer to activate the aerosolizer. A puff sensor may be operatively coupled to a controller of the aerosol-generating device. A puff sensor may detect an inhalation by the user on the mouth portion of the aerosol-generating device. The puff sensor may be positioned within an airflow channel in the aerosol-generating device to detect when a user inhales, or puffs, on the device. The puff may be detected by the controller using the puff sensor. Non-limiting types of puff sensors may include one or more of a vibrating membrane, a piezoelectric sensor, a mesh-like membrane, a pressure sensor (for example, a capacitive pressure sensor), and an airflow switch.

In response to the puff detection, the puff sensor may provide a puff profile, which may describe a magnitude or intensity (for example, speed) of inhalation. Any suitable mechanism for detecting a puff may be used. The puff sensor may include at least part of the control circuit to receive a signal from the puff sensor.

The housing of the aerosol-generating device may define an outer surface. The outer surface may be curved around a longitudinal axis. In particular, the outer surface may at least partially or entirely surround the longitudinal axis. The display may include a viewing surface that is also curved around the longitudinal axis. The curved viewing surface may at least partially or entirely surround the longitudinal axis. The curved viewing surface and the curved outer surface of the housing, together, may facilitate an overall shape of the aerosol-generating device that is familiar to users of conventional cigarettes. The curved viewing surface may also provide an increased viewing angle, which may facilitate in increased aesthetic interest to other people in social settings.

The viewing surface may be disposed adjacent to the curved outer surface of the housing. The viewing surface may be disposed flush, super flush (for example, be protruded), or sub flush (for example, be recessed) to the outer surface of the housing. The display may have the same shape as the outer surface of the housing. The display may be in the shape of a partial cylinder or include a cylindrical shape. The display may extend at least partially or entirely around the outer surface of the housing.

The display may be a flexible display to facilitate formation of the curved viewing surface. In particular, the flexible display may be flexed to provide the curved viewing surface. Once the display is fixed or otherwise coupled to the housing, the display may no longer be capable of flexing, for example, when the display is at least partially or entirely attached.

The curved viewing surface may extend at least partially around the longitudinal axis. For example, the curved viewing surface may extend at least about 90 degrees, about 180 degrees, about 270 degrees, or more. The viewing surface may extend completely around the longitudinal axis and the outer surface of the housing. For example, the viewing surface may extend around the longitudinal axis about 360 degrees. The viewing surface may extend around the longitudinal axis in a range of about 90 degrees to about 360 degrees, about 180 degrees to about 360 degrees, or about 270 degrees to about 360 degrees.

The display may include a plurality of pixels, for example, arranged into an array that are capable of forming images. The display may be used to show various images at different times. The images may be static images or motions images, which may be a series of static images or an encoded motion image. The display may show one or more viewable elements, selectable elements, and colours. The display may be a colour display. The colour display may be an active-matrix organic light-emitting diode (AMOLED) display, such an AMOLED display manufactured by TIANMA.

The display may have a sufficient density of pixels to provide a visual fidelity that is pleasing. The display may have a minimum resolution of greater than or equal to about 50 dots per inch (dpi), about 72 dpi, about 100 dpi, about 150 dpi, about 300 dpi, about 600 dpi, about 800 dpi, about 1000 dpi, about 1500 dpi, about 2000 dpi, about 2500 dpi, or about 3000 dpi. Preferably, the display may have a minimum resolution of about 800 dpi, about 802 dpi, about 804 dpi, about 806 dpi, or about 808 dpi. The display may have a maximum resolution of less than or equal to about 3000 dpi, about 2700 dpi, about 2600 dpi, about 2500 dpi, about 2000 dpi, about 1500, about 1000 dpi, about 800 dpi, about 600 dpi, about 300 dpi, about 150 dpi, about 100 dpi, or about 72 dpi. The display may have a resolution in a range from about 50 dpi to about 3500 dpi, about 72 dpi to about 3000 dpi, about 200 dpi to about 2000 dpi, or about 400 dpi to about 1000 dpi. Preferably, the display may have a minimum resolution of about 401 dpi, a maximum resolution of about 806 dpi, or a resolution in the range of about 401 dpi to about 806 dpi.

The minimum resolution may depend on the characters to be shown on the display. For example, the minimum resolution may be at least 806 dpi for Chinese-language characters.

The display may be a suitable size for use in a handheld aerosol-generating device. In particular, the display may be limited to the size of the aerosol-generating device while being large enough to perceive visually interesting images. The screen may have a viewable surface area of greater than or equal to about 0.5 mm by 0.5 mm, about 1 mm by about 1 mm, or about 2 mm by 2 mm. The viewable surface area of the screen may be less than or equal to the surface area of the aerosol-generating device.

The flexible display may include a touch sensitive component, which may be used to receive user input and to facilitate touch interaction with the aerosol-generating device. The touch sensitive component may be a transparent touchscreen disposed on the viewing surface of the display to at least partially or entirely cover the viewing surface. The touch sensitive component may include a selectable element disposed proximate or adjacent to the viewing surface (for example, a touch button no disposed over the viewing surface). The touch sensitive component may be implemented using any suitable technique, such as capacitive touch sensitivity or resistive touch sensitivity.

The viewing surface may be used to show one or more selectable elements, such as "virtual" touch buttons or icons, corresponding to touch-responsive areas of the touch sensitive component. For example, the viewing surface may show one selectable element and the touch sensitive component may define a touch button over the selectable element. The one selectable element may be used for a single function, such as a power button to power on and power off the aerosol-generating device or the display. Alternatively, the one selectable element may be used for multiple functions.

For example, the one selectable element may function as a power button when a first image is shown on the viewing surface and may function as a battery test button when a second image is shown on the viewing surface. Any other suitable functions may also be associated with the one selectable element.

The viewing surface may be used to show multiple selectable elements, each of which may be associated with a different function and each of which may be associated with different functions depending on the image currently shown on the viewing surface. For example, a first selectable element may be used as a power button and a second selectable element may be used as a battery test button.

The one or more selectable elements may be stored as data locally on the aerosol-generating device, for example, on a local memory. The aerosol-generating device may have a limited amount of memory capacity available to store data. The capacity may be limited, for example, by the physical size of the aerosol-generating device. One or more selectable elements may be downloaded onto the aerosol-generating device to facilitate a greater range of visual artistic effects available to the user. Downloaded selectable elements may be associated with the same, similar, or different functionalities to selectable elements already stored on the aerosol-generating device.

The control circuit of the aerosol-generating device may include one or more of a display driver, a communication interface, a controller (for example, a microprocessor or microcontroller), and a memory to store data. The control circuit may be operatively coupled to one or more of the display, the actuator, the aerosolizer, and the puff sensor to facilitate various functionality of the aerosol-generating device.

One or more of the controllers described herein may include a processor, such as a central processing unit (CPU), computer, logic array, or other device capable of directing data coming into or out of the aerosol-generating device. The controller includes one or more computing devices having memory, processing, and communication hardware. The functions of the controller may be performed by hardware and/or as computer instructions on a non-transient computer readable storage medium.

The processor of the controller may include any one or more of a microprocessor, a controller, a microcontroller, a digital signal processor (DSP), an application specific integrated circuit (ASIC), a field-programmable gate array (FPGA), and/or equivalent discrete or integrated logic circuitry. In some examples, the processor may include multiple components, such as any combination of one or more microprocessors, one or more controllers, one or more DSPs, one or more ASICs, and/or one or more FPGAs, as well as other discrete or integrated logic circuitry. The functions attributed to the controller or processor herein may be embodied as software, firmware, hardware, or any combination thereof. While described herein as a processor-based system, an alternative controller could utilize other components such as relays and timers to achieve the desired results, either alone or in combination with a microprocessor-based system.

The exemplary systems, methods, and interfaces may be implemented using one or more computer programs using a computing apparatus, which may include one or more processors and/or memory. Program code and/or logic described herein may be applied to input data/information to perform functionality described herein and generate desired output data/information. The output data/information may be applied as an input to one or more other devices and/or methods as described herein or as would be applied in a known fashion. In view of the above, it will be readily apparent that the controller functionality as described herein may be implemented in any manner known to one skilled in the art.

The control circuit may be used to enable various modes of the aerosol-generating device. One example includes a visual artistic effect on activation mode, in which a motion image may be shown on the viewing surface in response to activation of the aerosolizer, for example, by the actuator or puff senor. Upon detecting a puff and optionally receiving a puff profile, the controller may collect a memory address associated with the visual artistic effect to be shown. Data associated with the visual artistic effect may be fetched from the memory at the memory address. The data may be used to display or show the visual artistic effect on the viewing surface of the display. The visual artistic effect may be a static image or, preferably, a motion image for increased visual interest.

Other image data, such as user manuals or user messages, may be retrieved in a similar manner, for example, in response to a user action other than puffing. A remote user device (for example, a smartphone or tablet), may be used to detect one or more types of user actions, such as inputs on a touchscreen.

The visual artistic effect may be displayed concurrently with the activation of the aerosolizer, which may facilitate a similar effect to the burning of a conventional cigarette in response to a user puff. The control circuit may be used to activate the aerosolizer in response to detecting the puff or activation of the actuator. The visual artistic effect may have a duration that lasts at least part of or the entire duration of the puff. The visual artistic effect may last longer than the duration of the puff. For example, the visual artistic effect may continue up to about 5 seconds after the user finishes puffing. For example, the visual artistic effect may be a motion image that finishes animation when the user finishes puffing or up to about 5 seconds after the user finishes puffing.

Another example of a mode of the aerosol-generating device includes a visual artistic effect as continuous wall paper mode. This mode may display a wallpaper when the user is not puffing on the mouth portion of the device. A wallpaper may include a static or motion image, which may be fetched from the memory. The wallpaper may be related or unrelated to the image displayed in response to activation. For example, the control circuit may transition from the continuous wall paper mode to the activation mode in response to a user puff and may transition back to continuous wall paper mode when the user stops puffing. Having a related image may facilitate a more coherent visual experience when transitioning between modes. The visual artistic effect as continuous wall paper mode may display a static image as the wallpaper, for example, to save energy compared to displaying a motion image as the wallpaper.

Another example includes a configuration of user interface mode. This mode may display a user interface image, which may be stored in memory. The user interface image may include one or more selectable elements or viewable elements. User selection of selectable elements using the touchscreen or other buttons may be detected.

Another example of a mode of the aerosol-generating device includes a configuration by remote user device mode. In this mode, an image, a user selection, or a device configuration may be provided to the aerosol-generating device from a remote user device using the communication interface. The remote user device may be a smartphone or tablet. The communication interface may use any suitable communication protocol, such as Bluetooth. The image may be a static or motion image, which may represent a new visual artistic effect not already present in the memory or a new visual user interface image (for example, a new arrangement of selectable or viewable elements). The user selection may represent a visual artistic effect selection by the user using the touchscreen or the remote user device. The device configuration may include an automatic visual artistic effect selection based on detection of the aerosol-generating substrate, for example, by detecting the identifier.

Another example of a mode includes a modulated visual artistic effect mode. This mode may use a detected puff profile to increase visual interest related to puffing. In particular, the visual artistic effect may be modulated based on the puff profile. When the user puffs with a stronger intensity, the visual artistic effect may, for example, be modulated in terms of one or more of brightness, contrast, colour or colour tone, speed of animation, size, and visual quality accordingly. For example, a moderate puff may result in the visual artistic effect being displayed at a nominal speed. A big or fast puff may result in the visual artistic effect being modulated to display at a faster speed, for example, at about 1.5× of the nominal speed. A small or slow puff may result in the visual artistic effect being modulated to display at a slower speed, for example, at about 0.5× of the nominal speed.

The control circuit may include any suitable type of memory. The memory may have a physical size that is convenient for fitting in the housing of the aerosol-generating device. The memory may have a length by width less than or equal to about 3 mm by about 2 mm and a thickness dimension less than both the length and width. The length by width may be less than or equal to about 2.92 mm by about 1.52 mm. The memory may be a serial flash memory having a capacity suitable for storing at least static or motion image data. One example of a memory having a convenient size and capacity is LES25S161 memory in a WLCSP8 package as manufactured by ONSemiconductor.

The memory may store data representing one or more static or motion images (for example, as part of the factory settings or as downloaded by the user with a remote user device). The memory may store one, two, or more images. The memory may store a plurality of images. The one or more images stored may use a total of at least about 500, about 700, about 900, about 1000 kilobytes of memory capacity. Other data may also be stored on the memory in addition to the image data. The memory may have a total memory capacity that is less than or equal to about 4096 kilobytes or about 2048 kilobytes.

The communication interface of the control circuit may be used to operatively couple to a remote user device, for example, to transfer data. One or more images may be downloaded onto the aerosol-generating device from the remote user device using the communication interface. An application, or “app,” may be installed on the remote user device, such as a smartphone or tablet. The application may be used to receive user input and to configure which visual artistic effects are to be shown on the viewing surface under various conditions. The operative coupling may be wired or, preferably, wireless. The communication interface may include one or more of an antenna (for wireless communication) or a mini-Universal Serial Bus (USB) port (for wired communication). The communication interface may utilize a Bluetooth protocol, such as Bluetooth Low Energy, to provide wireless communication.

Any suitable static image may be an image displayable on the viewing surface of the flexible display. The static image may include a cartoon-like image or a realistic image. The static image may be displayed in colour on part of all the viewing surface.

Any suitable motion image may be an image displayable on the viewing surface of the flexible display. A motion image may appear as continuous movement or changes in the flexible display. For example, brightness or the colour of various pixels may change. The motion image may include a cartoon-like image, a live action image, or a life-like action image (for example, using computer generated graphics). Non-limiting examples of motion images include: animated flames, an animated object or creature (such as a fire-breathing dragon or fireworks), a colour change of at least one portion of the viewing surface, emulation of a conventional cigarette burning and reducing in length, and modulation overtime of a static or motion image (for example, a change in speed or colour tone).

A motion image may be stored as data in the memory of the aerosol-generating device, which may use more capacity of the memory than a static image. The motion image may be stored using an average compression rate of greater than or equal to about 1, about 1.5, or about 2 Megabits per second. Preferably, the motion image may be stored using an average compression rate of about 1.5 Megabits per second (about 188 kilobytes per second). The motion image data or file associated with a puff may have a nominal duration of animation of between about 0.5 to about 10 seconds, about 1 to about 7.5 seconds, about 2 to about 5 seconds. Preferably, the nominal duration of the motion image animation may be between about 2 to about 5 seconds. Each motion image file, or data associated with one motion image, may use less than or equal to about 2, about 1.5, about 1, or about 0.9 Megabytes of memory capacity. Preferably, each motion image file may use about 1 Megabyte of memory capacity.

The remote user device may be any suitable remote user device capable of communicating with the aerosol-generating device. For example, the remote user device may be a smart phone, a tablet, or other device remote to the aerosol-generating device. The remote user device may include its own communication interface to operatively couple to the aerosol-generating device. The operative coupling may be wired or, preferably, wireless. The communication interface may include one or more of an antenna (for wireless communication) or a mini-Universal Serial Bus (USB) port (for wired communication). The communication interface may utilize a Bluetooth protocol, such as Bluetooth Low Energy, to provide wireless communication. The communication interface may also be capable of connecting the remote user device to the Internet.

The remote user device may be used for various functionality related to the aerosol-generating device. Non-limiting examples of using the remote user device include managing images, capturing user selections, and configuring the aerosol-generating device. Non-limiting examples of configuring the aerosol-generating device include selecting a particular visual artistic effect to display on the viewing surface, downloading one or more visual artistic effects, and selecting a colour of the visual artistic effect (particularly for a change in colour effect when puffing).

Although the remote user device may facilitate some functionality of the aerosol-generating device, such as configuration of the aerosol-generating device, the remote user device may not needed for daily use of the aerosol-generating device. For example, at least one image may be stored on the aerosol-generating device to be displayed in response to a user puff without needing a remote user device to be operatively coupled, or connected, to the remote user device.

The remote user device, or more specifically an application installed on the remote user device, may be configured with various modes. The user may make selections regarding the various modes using, for example, a touchscreen of the remote user device.

One example of an application mode includes a select a visual artistic effect mode. The user may open the application installed on the remote user device to a main menu. The user may want to download one or more of the visual artistic effects, for example, by using a selectable element to enter a submenu. Upon selection, a submenu may be displayed with a choice of visual artistic effects. The user may choose one or more of the visual artistic effects to download. The selected visual artistic effects may be downloaded to the aerosol-generating device from the remote user device using the communication interfaces. At any point in any of the submenus described herein, the user may want to return to the main menu and may be able to select a "no" or "cancel" element (for example, a touch button).

Another example of an application mode includes a customize the functionality of the aerosol-generating device mode, which may be used to change the functionality of the aerosol-generating device from its factory programming. The user may want to customize functionality, for example, by using a selectable element of the main menu to enter a submenu. The submenu may display one or more options for configuring the aerosol-generating device that are selectable by the user. Non-limiting examples of the options include enabling a visual artistic effect configuration, enabling a video manual configuration, and enabling a video message configuration. The user may choose to proceed with configuring the selected options, or to "register" the selected options, for example, by using a selectable element to enter one or more additional submenus. Each submenu may be related to a different one of the selected options. The submenus may be displayed in any suitable manner, such as concurrently, sequentially, or a combination of both.

If the visual artistic effect configuration was selected, a submenu may be displayed showing a selection to enable a default visual artistic effect or to enable an automatic visual artistic effect. If the default visual artistic effect is selected, another submenu may be displayed that allows the user to select a visual artistic effect from visual artistic effects stored in the memory of the aerosol-generating device. If the automatic visual artistic effect is selected, the aerosol-generating device may automatically select a visual artistic effect based on the detected aerosol-generating substrate associated with the aerosol-generating device. For example, the visual artistic effect may be selected by the aerosol-generating device based on an identifier of the cartridge or stick coupled to the aerosolizer. The visual artistic effect may be displayed on the viewing screen in response to a puff detection or a puff profile.

If the video manual configuration was selected, a submenu may be displayed showing a selection to start a video manual on power-on or to start a video manual on detecting user pattern. If the start a video manual on power-on is selected, a video user manual may be displayed on the viewing surface when the aerosol-generating device is turned on, for example, by the user pressing a power button of the aerosol-generating device. If the start a video manual on detecting user pattern is selected, a video user manual may be displayed on the viewing surface when a particular user pattern is detected. For example, the aerosol-generating device may detect that the power button is pressed four consecutive times within a time period, and then a video manual may be played on the viewing surface.

If the video message configuration was selected, a submenu may be displayed to show two or more choices for the video message to be displayed to the user. Any useful type of video message may be displayed to the user. One video message may display, for example, "battery test activated; the device will not start." The aerosol-generating device may enter a battery test mode when a power button is pressed and released too quickly, which may mitigate unintended starting of the device. Another video message may display, for example, "device starting, you can start vaping in 30 seconds." The device may turn on when the power button is pressed but vaping may not begin immediately.

After configuration of each of the selected options is finished, the user may choose to proceed with downloading data, or "registering" the configurations, to the aerosol-generating device using, for example, a selectable element. Any device configuration and visual artistic effects may be downloaded to the aerosol-generating device using the communication interfaces.

Another example of an application mode includes a customize the visual user interface mode. The user may want to customize the visual user interface of the aerosol-generating device, for example, by using a selectable element to enter a submenu. The user may select one or more options to configure the visual user interface of the aerosol-generating device relating to one or more of viewable elements, selectable elements, the arrangement of elements, colours, sizes, and visual quality.

The aerosol-generating device may be used according to various methods. The aerosol-generating device may detect a puff on the aerosol-generating device of a user. Then, a motion image may be displayed on the curved viewing surface of the flexible display of the aerosol-generating device. A non-transitory computer readable storage medium may include a stored computer program that, when run on programmable electric circuitry of the aerosol-generating device, may cause the programmable electric circuitry to execute various methods for use with the aerosol-generating device, in particular to interact with the user using one or more senses.

The visual user interface for the aerosol-generating device may be understood with reference to one or more drawings. The schematic drawings are not necessarily to scale and are presented for purposes of illustration and not limitation. The drawings depict one or more aspects described in this disclosure. However, it will be understood that other aspects not depicted in the drawing fall within the scope of this disclosure.

FIG. 1 is a schematic illustration showing an aerosol-generating device 10 providing a visual user interface 12 for a user. The device 10 may include a housing 14 with an outer surface 16, which may be curved to surround a longitudinal axis 18. Generally, the aerosol-generating device 10 may be elongate and extend along the axis 18.

The device 10 may also include a flexible display 20 with a viewing surface 22, which may be curved to at least partially surround the axis 18. The display 20 may extend around the axis 18 about 90 degrees or more.

The outer surface 16 may include a cylindrical shape. The display 20 may be disposed adjacent to the outer surface 16. The display 20 may be in the shape of a partial cylinder. In particular, the display 20 may be flush to the outer surface 16.

Any suitable display 20 may be used, such as an AMO-LED display. The display 20 may be touch sensitive. For example, a transparent touchscreen may cover the viewing surface 22.

The device 10 may include a mouth portion 24 and a controller portion 28. The controller portion 28 may be distal to the mouth portion 24 along the axis 18. An actuator 26 may be disposed on the mouth portion 24 or the controller portion 28. The actuator 26 may be used to activate an aerosolizer of the device 10 in response to the actuator being pressed by the user. The display 20 may be disposed on the mouth portion 24 or the controller portion 28. The display 20 may be disposed distal to the mouth portion 24, the actuator 26, or both.

Figure 2A:
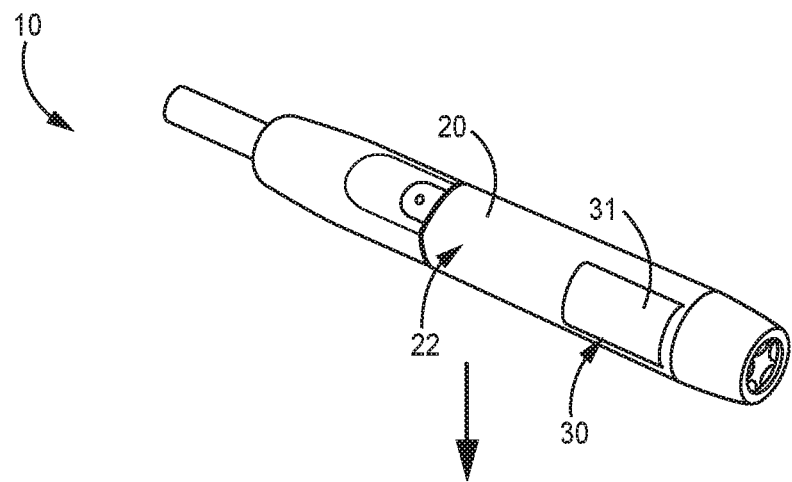
Figure 2B:
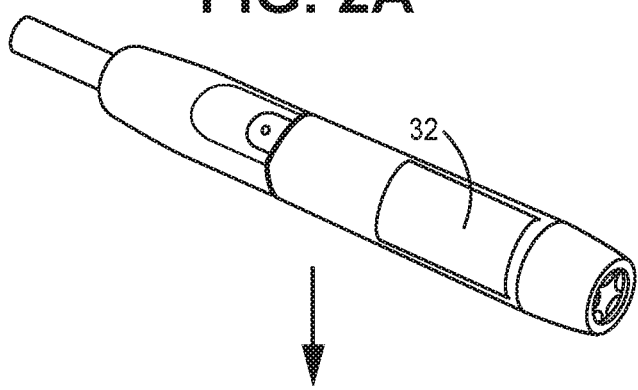
Figure 2C:
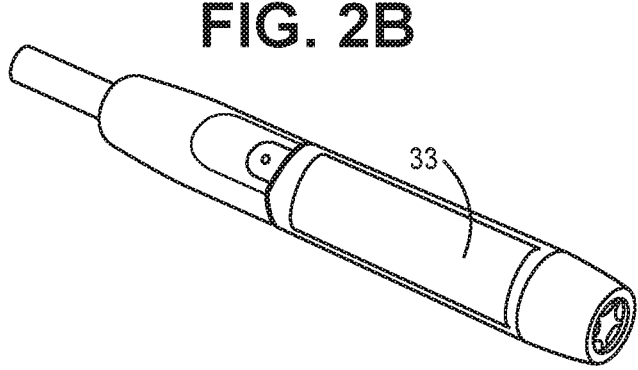

FIG. 2A, FIG. 2B, and FIG. 2C are schematic illustrations showing a progression over time of a motion image 30 displayed on the aerosol-generating device 10. In particular, various snapshots 31, 32, 33 of the motion image 30 are shown on the viewing surface 22 of the display 20. Although only three snapshots are shown, the motion image 30 may be an animation that includes a plurality of images sufficient to provide a continuous motion experience for the user. As can be seen, the motion image 30 may grow from snapshot 31, which covers about one-third of the viewing surface 22 at an early point in the animation, to snapshot 32, which covers about one-half of the viewing surface at a middle point in the animation. The motion image 30 may then grow to snapshot 32, which covers all or almost all of the viewing surface 22 at a late point in the animation. Although the size of the motion image 30 changes in this illustration, the motion image 30 may change in a various number of ways over time. For example, the motion image 30 may include a change in one or more of colour, brightness, contrast, colour or colour tone, speed of animation, size, and visual quality. The change may be shown on at least one portion of the viewing surface 22.

Change in the motion image 30 may be modulated in response to a puff profile of a user puff, which may also activate an aerosolizer of the device 10. The viewing surface 22 may also be used to display a static image, for example, when a user is not puffing on the mouth portion of the device.

Figure 3:
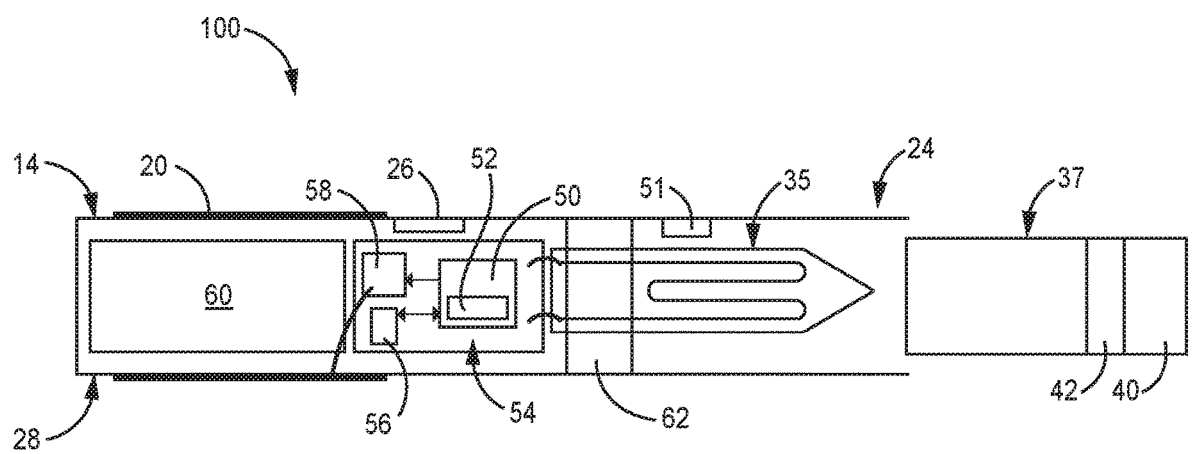
Figure 4:
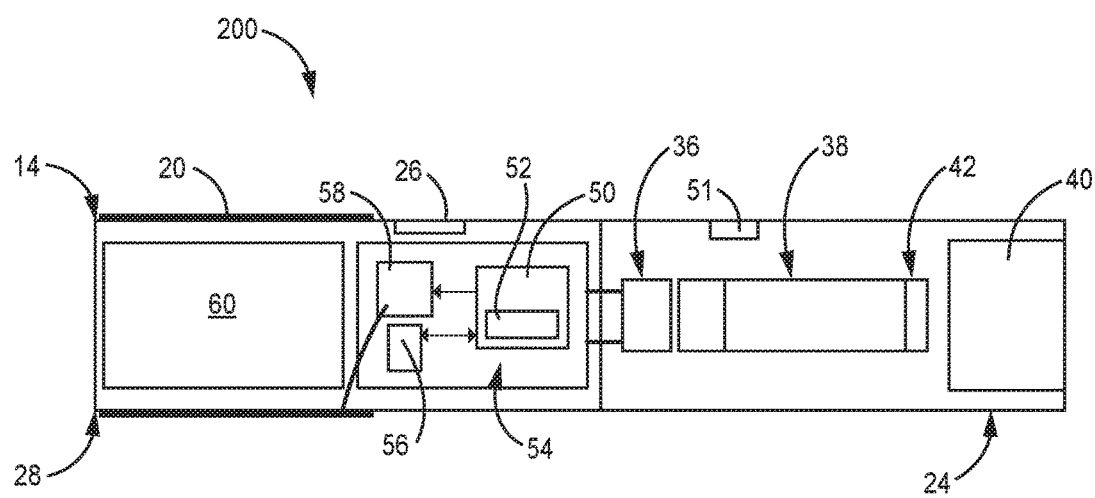
Figure 5:
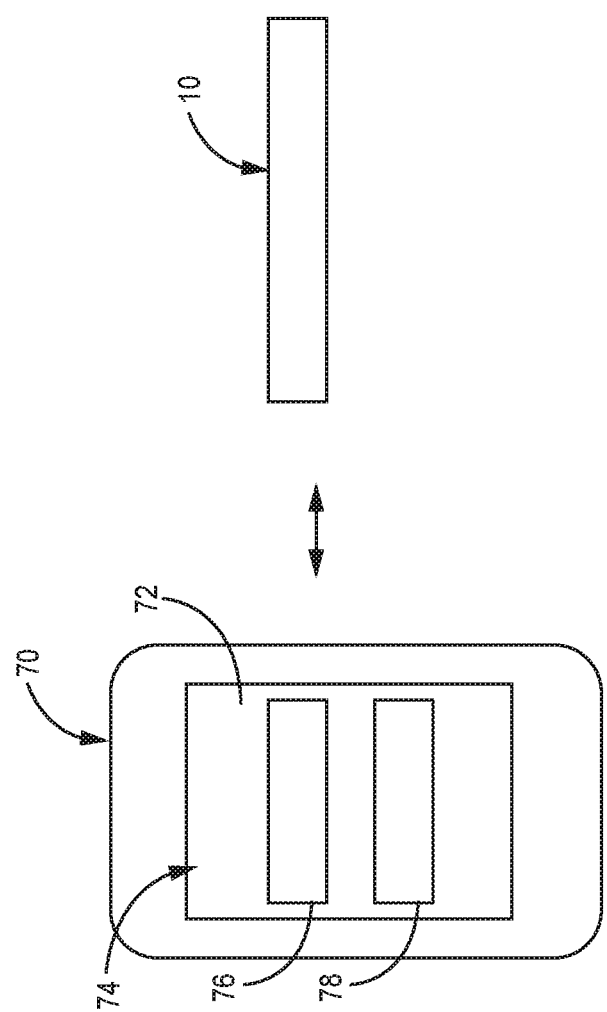
Figure 6:
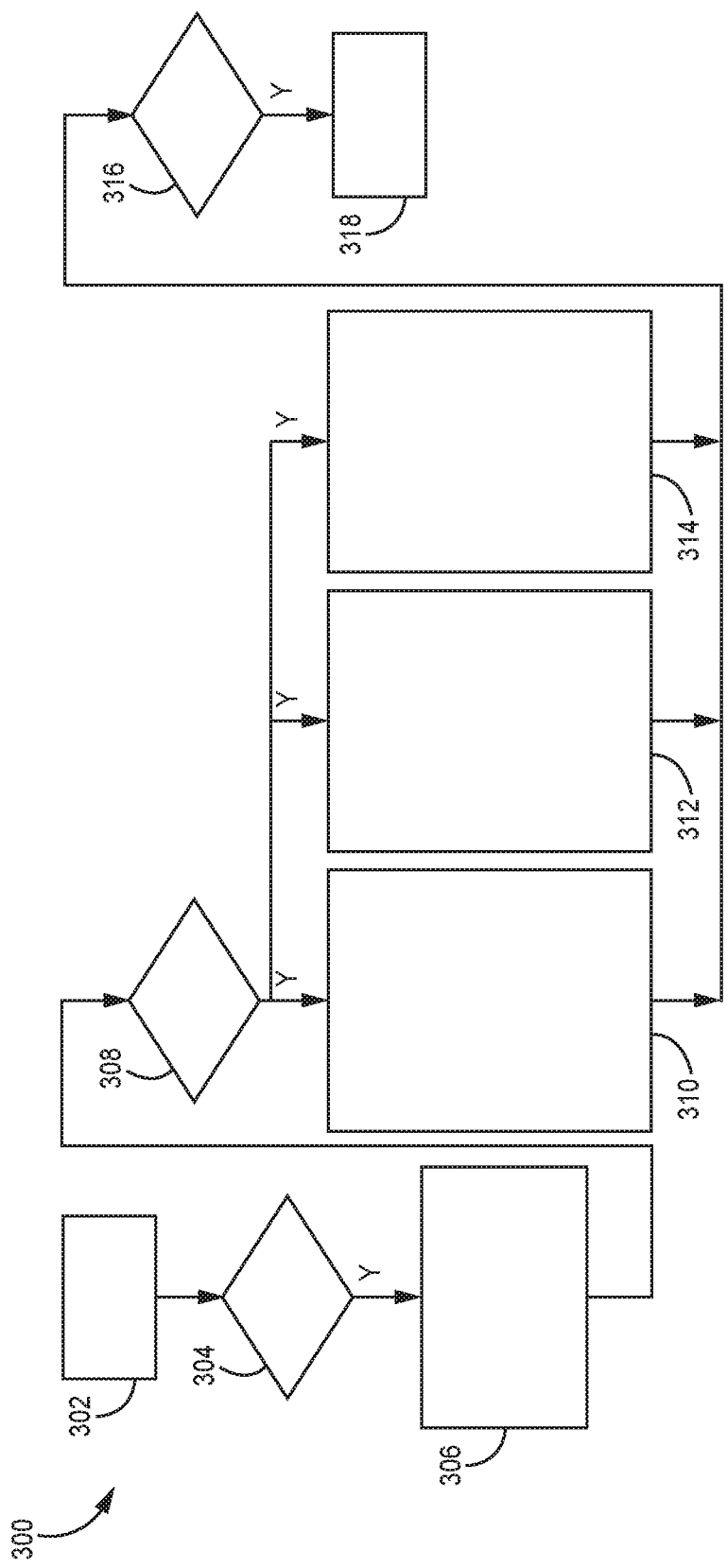

FIG. 3 is a schematic illustration showing an aerosol-generating device 100 in a cross-sectional view, which may be one example of the aerosol-generating device 10 (FIG. 1). The device 100 may include a housing 14, a mouth portion 24, and a controller portion 28. A power source 60, such as a battery, may be operatively coupled to one or more components to provide power. An actuator 26 and a display 20 may be disposed on the controller portion 28. The mouth portion 24 may include an aerosolizer 35 in the form of a heating blade. An aerosol-generating substrate 37 in the form of a heat stick may be inserted into the mouth portion 24 and onto the aerosolizer. A container of the aerosol-generating substrate 37 may include or may be coupled to a mouthpiece 40 and an identifier 42. The user may inhale on the mouthpiece 40 to register a user puff. The identifier 42 may contain an identifier related to the type of aerosol-generating substrate 37 or other related characteristics.

A thermal brake 62 may be disposed between at least a portion of the aerosolizer 35 and a control circuit 54. The aerosolizer 35 may extend through the thermal brake 62. The control circuit 54 may include components to enable various functionality of the device 100, which may be sensitive to heat produced by the aerosolizer 35.

The control circuit 54 may include a controller 50, which may be a microcontroller or microprocessor, and a communications interface 52. The controller 50 may be operatively coupled to the aerosolizer 35 and the communications interface 52. The communications interface 52 may be integrated into the controller 50. The communications interface 52 may be capable of communicating using a Bluetooth protocol, such as BLE. The communications interface 52 may be used to download one or more images from a remote user device. A puff sensor 51 may be operatively coupled to the control circuit 54 and positioned to detect an inhalation of the user on the mouth portion 24.

The control circuit 54 may include a memory 56 operatively coupled to the controller 50. The memory 56 may be used to store data, such as one or more images, user selections, and device configurations. The control circuit 54 may include a display driver 58 operatively coupled to the controller 50. Although not shown, the display driver 58 may be integrated into the controller 50.

The display 20, which may wrap at least partially around the housing 14, may be operatively coupled to the control circuit 54, such as the display driver 58 or the controller 50. An image may be fetched from the memory 56 and provided to the display driver 58 to show on the display 20. One or more motion images may be stored in the memory 56 using at least about 500 kilobytes. The memory 56 may be used to store a plurality of images including one or more motion images.

FIG. 4 is a schematic illustration showing an aerosol-generating device 200 in a cross-sectional view, which may be one example of the aerosol-generating device 10 (FIG. 1). Many of the parts and components depicted in FIG. 3 are the same or similar to those depicted in, and described with regard to, FIG. 2. Reference is made to the discussion above regarding FIG. 2 for numbered elements depicted in, but not specifically discussed with regard to, FIG. 3.

The device 200 may differ from the device 100 in that the aerosolizer 36 may be in the form of a heater, which may include a heating element, and the aerosol-generating substrate 38 may contain a liquid. The mouthpiece 40 may be disposed on the mouth portion 24. The device 200 may not include a thermal brake 62 (FIG. 3).

FIG. 5 is a schematic illustration showing the aerosol-generating device 10, which may be in operative communication to transfer data with a remote user device 70. The remote user device 70 and the device 10 may each include a respective communication interface to enable operative communication between the devices, for example, using a Bluetooth protocol. The remote user device 70 may include a user input and output components, such as a display 72 having a touchscreen. An application 74 may be shown on the display 72 when opened by the user. The application 74 may show one or more elements on the display 72, such as a viewable element 76 or a selectable element 78 (for example, a button).

FIG. 6 is a flowchart showing a method 300 for using a remote user device, such as remote user device 70 (FIG. 5). The method 300 may related to customizing an aerosol-generating device. However, the remote user device 70 may be used for other functionality, such as downloading visual artistic effects onto the aerosol-generating device.

The method 300 may begin with process 302, in which a main menu is displayed when an application is opened by a user that relates to interacting with the aerosol-generating device. The method 300 may continue to process 304, in which the remote user device determines whether the user has selected to configure the aerosol-generating device. If so, the method 300 may continue to process 306. If not, the method 300 may keep checking to determine whether the user has made a selection.

In process 306, a submenu may be displayed allowing the user to select one or more functions to customize on the aerosol-generating device, such as customizing a visual artistic effect configuration, a video manual configuration, or a video message configuration. In process 308, the remote user device may determine whether the user has selected to proceed with configuring the one or more selected options. If so, the method 300 may proceed to one or more processes 310, 312, 314. If not, the method 300 may keep checking to determine whether the user has made a selection.

The process may proceed onto one or more of processes 310, 312, 314, which may display one or more submenus on the remote user device concurrently, sequentially, or a combination of both. For example, in process 310, a submenu may be displayed showing a selection to enable a default visual artistic effect or to enable an automatic visual artistic effect. In process 312, a submenu may be displayed showing a selection to start a video manual on power-on or to start a video manual on detecting user pattern. In process 314, a submenu may be displayed to show two or more choices for the video message to be displayed to the user.

Once one or more of processes 310, 312, 314 are completed, the user may choose to download or register the selected configurations onto the aerosol-generating device in process 316. If the remote user device detects that the user has selected to register the configurations, the method 300 may continue to process 318. If not, the method 300 may keep checking to determine whether the user has made a selection. In process 318, the remote user device may download the selected configurations using the respective communication interfaces of the remote user device and the aerosol-generating device. The aerosol-generating device may then store the configurations into memory.

The specific embodiments described above are intended to illustrate the invention. However, other embodiments may be made without departing from the scope of the invention as defined in the claims, and it is to be understood that the specific embodiments described above are not intended to be limiting.

As used herein, the singular forms “a,” “an,” and “the” encompass embodiments having plural referents, unless the content clearly dictates otherwise.

As used herein, “or” is generally employed in its sense including “and/or” unless the content clearly dictates otherwise. The term “and/or” means one or all of the listed elements or a combination of any two or more of the listed elements.

As used herein, “have,” “having,” “include,” “including,” “comprise,” “comprising” or the like are used in their open-ended sense, and generally mean “including, but not limited to.” It will be understood that “consisting essentially of,” “consisting of,” and the like are subsumed in “comprising,” and the like.

The words “preferred” and “preferably” refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

The invention claimed is:

1. An aerosol-generating device providing a visual user interface, the device comprising:
- a housing comprising a curved outer surface surrounding a longitudinal axis;
- a flexible display comprising a curved viewing surface at least partially surrounding the longitudinal axis disposed adjacent to the curved outer surface;
- an aerosolizer to generate aerosol from an aerosol-generating substrate; and
- a control circuit operatively coupled to the flexible display and comprising a memory to store a motion image, the control circuit configured to display the motion image on the curved viewing surface in response to activation of the aerosolizer, the control circuit configured to modulate the displayed motion image in response to a puff profile of a user puff used to activate the aerosolizer,
- wherein the user puff is an inhalation by the user on the aerosol-generating device, and the puff profile describes a magnitude or intensity of the inhalation by the user.

2. The device of claim 1, wherein the flexible display is an AMOLED display.

3. The device of claim 1, wherein the flexible display is touch sensitive, and wherein the flexible display is configured to display one or more selectable elements.

4. The device of claim 1, wherein the flexible display extends around the longitudinal axis 90 degrees or more.

5. The device of claim 1, wherein the flexible display is in the shape of a partial cylinder.

6. The device of claim 1, wherein the flexible display is disposed distal to a mouth portion, an actuator, or both, the actuator configured to activate the aerosolizer in response to being pressed by the user.

7. The device of claim 1, wherein the motion image comprises a colour change of at least one portion of the curved viewing surface.

8. The device of claim 1, wherein the control circuit is further configured to display a static or motion image when a user is not puffing on a mouth portion of the device.

9. The device according to claim 1, wherein the memory is configured to store the motion image using at least 500 kilobytes.

10. The device according to claim 1, wherein the memory is configured to store a plurality of images including the motion image.

11. The device according to claim 1, wherein the control circuit comprises a communication interface configured to download one or more images from a remote user device.

12. A method for use with the aerosol-generating device, the method comprising:
- detecting activation of the aerosolizer of the aerosol-generating device of claim 1; and
- displaying the motion image on the curved viewing surface of the flexible display.

13. A non-transitory computer readable storage medium including a stored computer program that, when run on programmable electric circuitry, causes the programmable electric circuitry to execute the method according to claim 12.

* * * * *